United States Patent
Jung et al.

(10) Patent No.: US 7,963,707 B2
(45) Date of Patent: Jun. 21, 2011

(54) DOME TYPE SECURITY CAMERA STRUCTURE WITH REINFORCED WATERPROOFING FUNCTION

(75) Inventors: Kyung Jung, Seoul (KR); Na Young Kang, Incheon (KR)

(73) Assignee: Powertech Electronics, Incheon (KR)

( * ) Notice: Subject to any disclaimer, the term of this patent is extended or adjusted under 35 U.S.C. 154(b) by 0 days.

(21) Appl. No.: 12/829,969

(22) Filed: Jul. 2, 2010

(65) Prior Publication Data

US 2010/0272427 A1    Oct. 28, 2010

Related U.S. Application Data (63) Continuation of application No. PCT/KR2009/002318, filed on Apr. 30, 2009.

(30) Foreign Application Priority Data

Mar. 31, 2009    (KR) .................. 10-2009-0027548

(51) Int. Cl.
*G03B 17/00* (2006.01)
(52) U.S. Cl. ..................................... 396/427
(58) Field of Classification Search .............. 396/427
See application file for complete search history.

(56) References Cited

U.S. PATENT DOCUMENTS

| | | | | |
|---|---|---|---|---|
| 6,061,087 A * | 5/2000 | Schieltz et al. | ............... | 348/151 |
| 7,811,010 B2 * | 10/2010 | Yamashita | .................... | 396/427 |
| 2009/0196593 A1 * | 8/2009 | Cheng | ............................ | 396/155 |
| 2009/0207249 A1 * | 8/2009 | Erel et al. | ...................... | 348/143 |
| 2010/0111516 A1 * | 5/2010 | Basho | ........................... | 396/427 |
| 2011/0013900 A1 * | 1/2011 | Takahashi | ..................... | 396/427 |

FOREIGN PATENT DOCUMENTS

| | | |
|---|---|---|
| JP | 03-282526 A | 12/1991 |
| KR | 1020070063620 A | 6/2007 |

* cited by examiner

*Primary Examiner* — Rodney E Fuller
(74) *Attorney, Agent, or Firm* — Edwards Angell Palmer & Dodge LLP; Kongsik Kim (57) ABSTRACT

A dome type security camera structure with a reinforced waterproofing function is disclosed. The camera structure includes a housing (100) having an outside wire insert hole (110), and a pair of opposite guide grooves (120). Each guide groove communicates with an outside via a discharge hole (130). A mounting bracket (200) has a coupling protrusion (210) guided by each guide groove, and is gradually inclined outwards from a center thereof so that an edge thereof presses a lower surface of the housing and thus the mounting bracket is coupled to the housing. A holder (300) is provided on a lower surface of the mounting bracket in such a way as to perform rotation on 2 or 3 axes, with a camera module mounted to the holder. A dome screen (400) is mounted to the mounting bracket, and surrounds the holder.

13 Claims, 7 Drawing Sheets

DOME TYPE SECURITY CAMERA STRUCTURE WITH REINFORCED WATERPROOFING FUNCTION

CROSS-REFERENCE TO RELATED APPLICATION

This application is a continuation of PCT/KR2009/002318 filed on Apr. 30, 2009 which claims the benefit of Korean Application No. 10-2009-0027548 filed on Mar. 31, 2009, the entire contents of which are incorporated herein by reference.

TECHNICAL FIELD

The present invention relates, in general, to a dome type security camera structure with a reinforced waterproofing function and, more particularly, to a dome type security camera structure with a reinforced waterproofing function which is constructed to drain moisture, such as rainwater, that enters the camera structure through a housing, between the housing and a mounting bracket.

BACKGROUND ART

Generally, dome type security cameras are often installed in interiors and outdoors, such as in outdoor parking lots or on the outer walls of a building, for the purpose of security.

Figure 1:
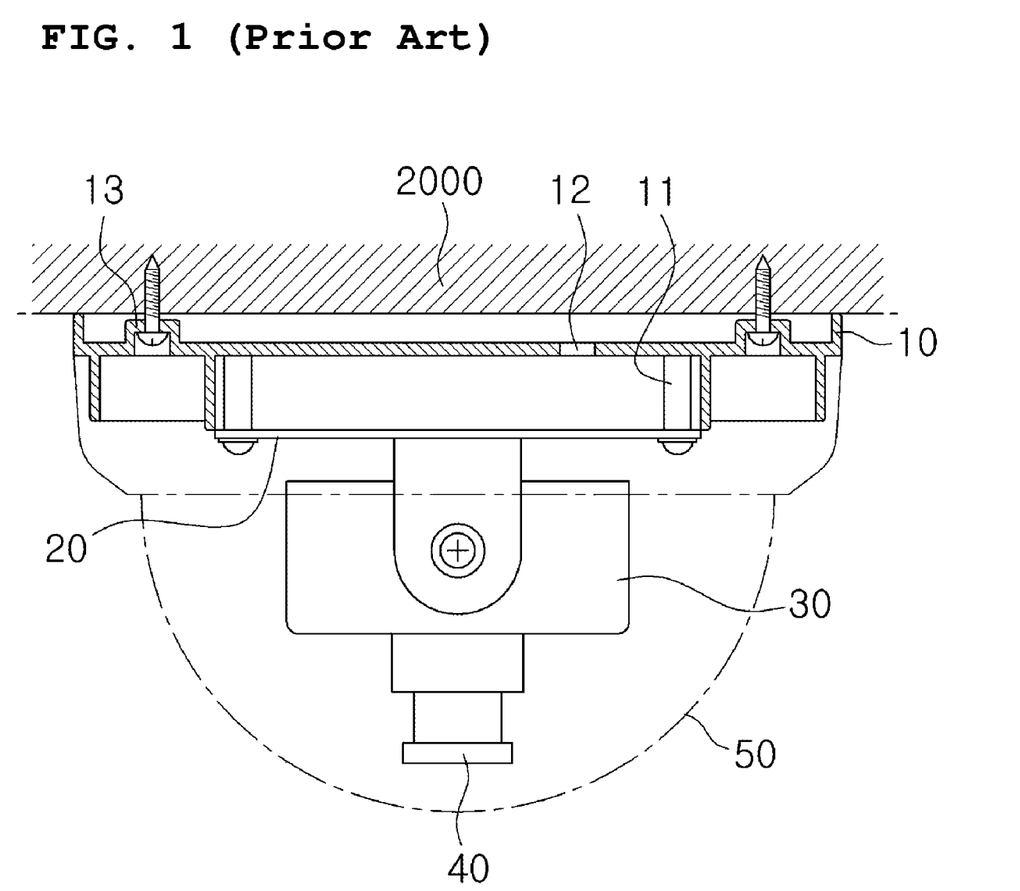
FIG. 1 is a sectional view illustrating a conventional dome type security camera.

As shown in FIG. 1, the dome type security camera usually includes a housing 10, a guide member 20, a module holder 30, a camera module 40, and a dome screen 50. The housing 10 is mounted to an outer wall or a support 2000. The guide member 20 is coupled to the bottom of the housing 10 by a plurality of guide protrusions 11 which protrude therefrom. The module holder 30 is hinged to the guide member 20 in such a way as to move up and down. The camera module 40 is coupled to the module holder 30 so that its angle of rotation can be adjusted. The dome screen 50 is detachably mounted to the housing 10 in such a way as to surround the camera module 40.

Particularly, mounting holes 13 for mounting the housing 10 to the outer wall of the building or the like, an external power connection hole 12, and holes for mounting other components are formed in the housing 10.

However, the conventional dome type security camera has the following problems.

1) Since we have the mounting hole for mounting the housing to the outside, the external power connection hole, and the holes for mounting other components, moisture or rainwater may enter from the outside through these holes and into the camera.

2) Particularly, the rainwater entering the camera space as such may affect internal components, thus causing damage to the external power or the camera module.

SUMMARY OF THE DISCLOSURE

Accordingly, the present invention has been made keeping in mind the above problems occurring in the prior art, and an object of the present invention is to provide a dome type security camera structure with a reinforced waterproofing function, which is constructed to guide rainwater entering into a housing along a bracket supporting a camera module to the edge of the housing, thus discharging the rainwater to the outside.

In order to accomplish the above object, the present invention provides a dome type security camera structure with a reinforced waterproofing function, including a housing 100 having an outside wire insert hole 110, and a pair of opposite guide grooves 120 provided on an inner surface of a sidewall of the housing, each of the guide grooves communicating with an outside via a discharge hole 130; a mounting bracket 200 which has a coupling protrusion 210 guided by each of the guide grooves 120, and is gradually inclined outwards from a center thereof so that an edge thereof presses a lower surface of the housing and thus the mounting bracket is coupled to the housing; a holder 300 provided on a lower surface of the mounting bracket in such a way as to perform rotation on 2 or 3 axes, with a camera module being mounted to the holder; and a dome screen 400 mounted to the mounting bracket 200 and surrounding the holder 300 in such a way as to adjust a position of the holder in all directions.

The housing 100 may further include a step 140 so that an outer edge of an outer circumference thereof surrounds an entire outer circumference of the mounting bracket 200.

Further, the guide groove 120 may have on an inner end thereof a protrusion seat 121 to receive the coupling protrusion 210. The guide groove 120 may be formed such that a depth thereof is reduced in a direction from an outer position to an inner position. Contact side surfaces of the guide groove 120 and the coupling protrusion 210 may be inclined.

Further, the discharge hole 130 may be formed on the inner end of the guide groove 120. The discharge hole 130 may be closed by a lock screw 131. The discharge hole 130 may be formed in the protrusion seat 121. A lower portion of the protrusion seat 121 may be formed to be lower than the guide groove 120, thus providing a step 121a.

The mounting bracket 200 may have on a central portion thereof an outside wire mounting hole 220 to be placed on a central axis of the outside wire insert hole 110, and may be stepped outward from the outside wire mounting hole 220. A step of the mounting bracket 200 may be inclined downward in a direction from an inner position to an outer position. The mounting bracket 200 may be mounted to have a hollow space 230 between the mounting bracket and an inner surface of the housing 100. Further, the mounting bracket 200 may further include an airtight sealing member 250' between the mounting bracket and the dome screen 400 to airtightly seal a gap therebetween.

The present invention achieves the following effects.

1) Since water entering into a housing is guided along the upper surface of a mounting bracket to the outside of the housing and is thus discharged to the outside, the function of preventing the passage of water to an external power and a camera module can be improved upon.

2) Since the operation and maintenance of a security camera can be easily performed owing to the improved waterproofing function, cost savings can be expected.

Reference numerals set forth in the Drawings includes reference to the following elements as further discussed below:

| | |
|---|---|
| 100: housing | 110: outside wire insert hole |
| 120: guide groove | 121: protrusion seat |
| 121a: step | 122: insert seat |
| 130: discharge hole | 131: lock screw |
| 200: mounting bracket | 210: coupling protrusion |
| 220: outside wire mounting hole | 230: space |
| 240: coupling part | 250: ring groove |
| 250a: airtight sealing member | 300: holder |
| 400: dome screen | 1000: outside wire |

DETAILED DESCRIPTION OF EMBODIMENTS

Hereinafter, the present invention will be described below in detail with reference to the accompanying drawings.

Structure

Figure 2:
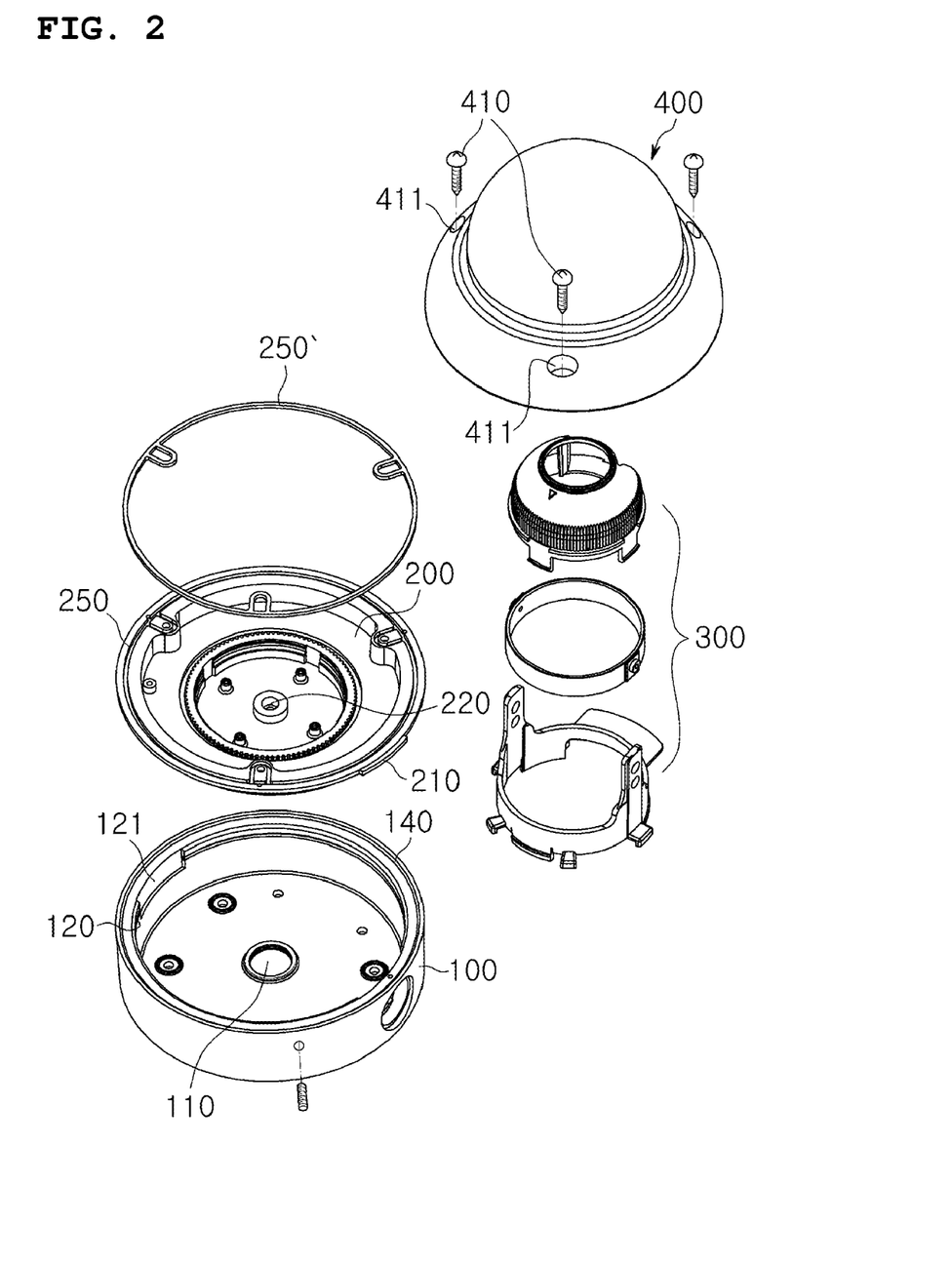
FIG. 2 is an exploded perspective view illustrating the overall construction of a dome type security camera structure with a reinforced waterproofing function according to the present invention.
Figure 3:
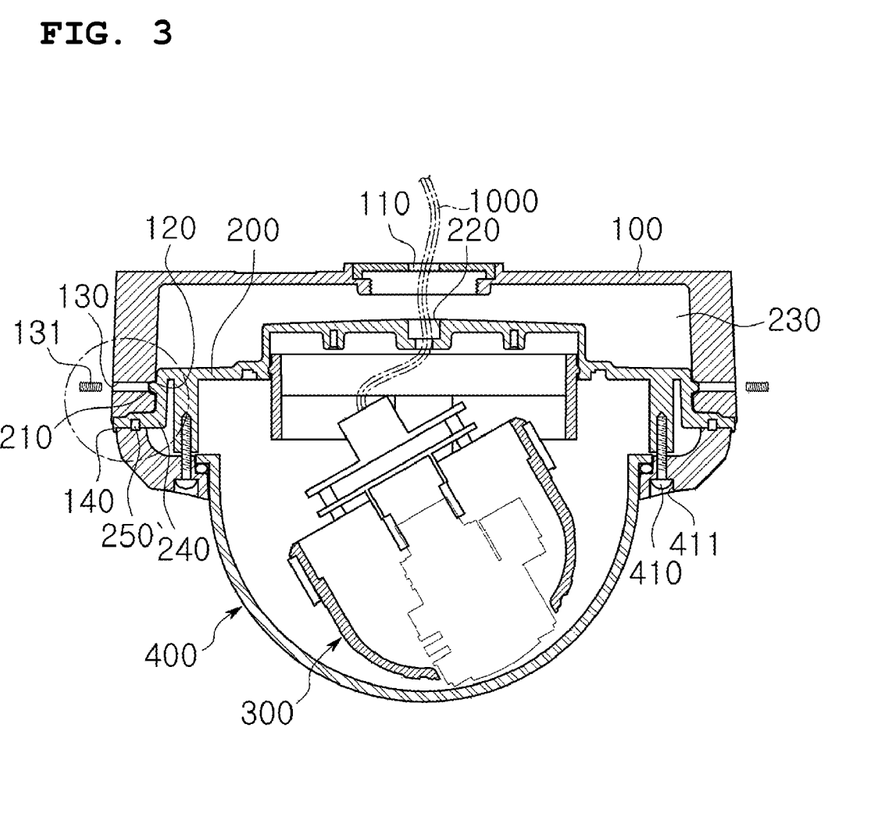
FIG. 3 is a sectional view illustrating the dome type security camera structure with the reinforced waterproofing function according to the present invention.
Figure 4:
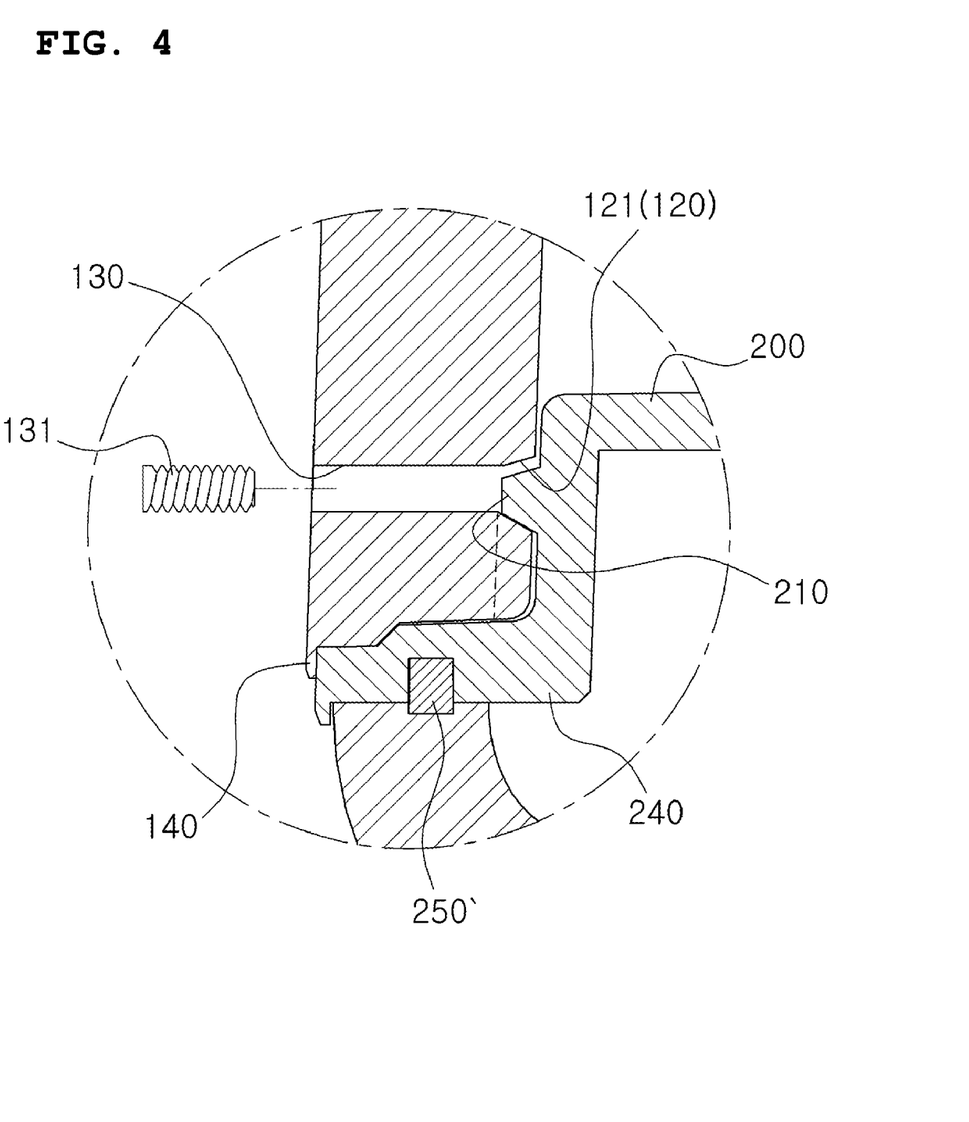
FIG. 4 is an enlarged view illustrating the joint portion shown by the imaginary line of FIG. 3.

FIG. 2 is an exploded perspective view illustrating the overall construction of a dome type security camera structure with a reinforced waterproofing function according to the present invention, FIG. 3 is a sectional view illustrating the dome type security camera structure with the reinforced waterproofing function according to the present invention, and FIG. 4 is an enlarged view illustrating the joint portion shown by the imaginary line of FIG. 3. Reference numeral "2000" denotes an outer wall or a support.

According to the present invention, the dome type security camera structure includes a housing 100, a mounting bracket 200, a holder 300, and a dome screen 400. The housing 100 is mounted to the outer wall of a building or the support 2000. The mounting bracket 200 is coupled to the lower portion of the housing 100 to guide water entering into the housing 100 to the outside. The holder 300 is coupled to the mounting bracket 200 in such a way as to perform rotation on 2 or 3 axes, and serves to hold a camera module. These components will be described below in detail.

Figure 5:
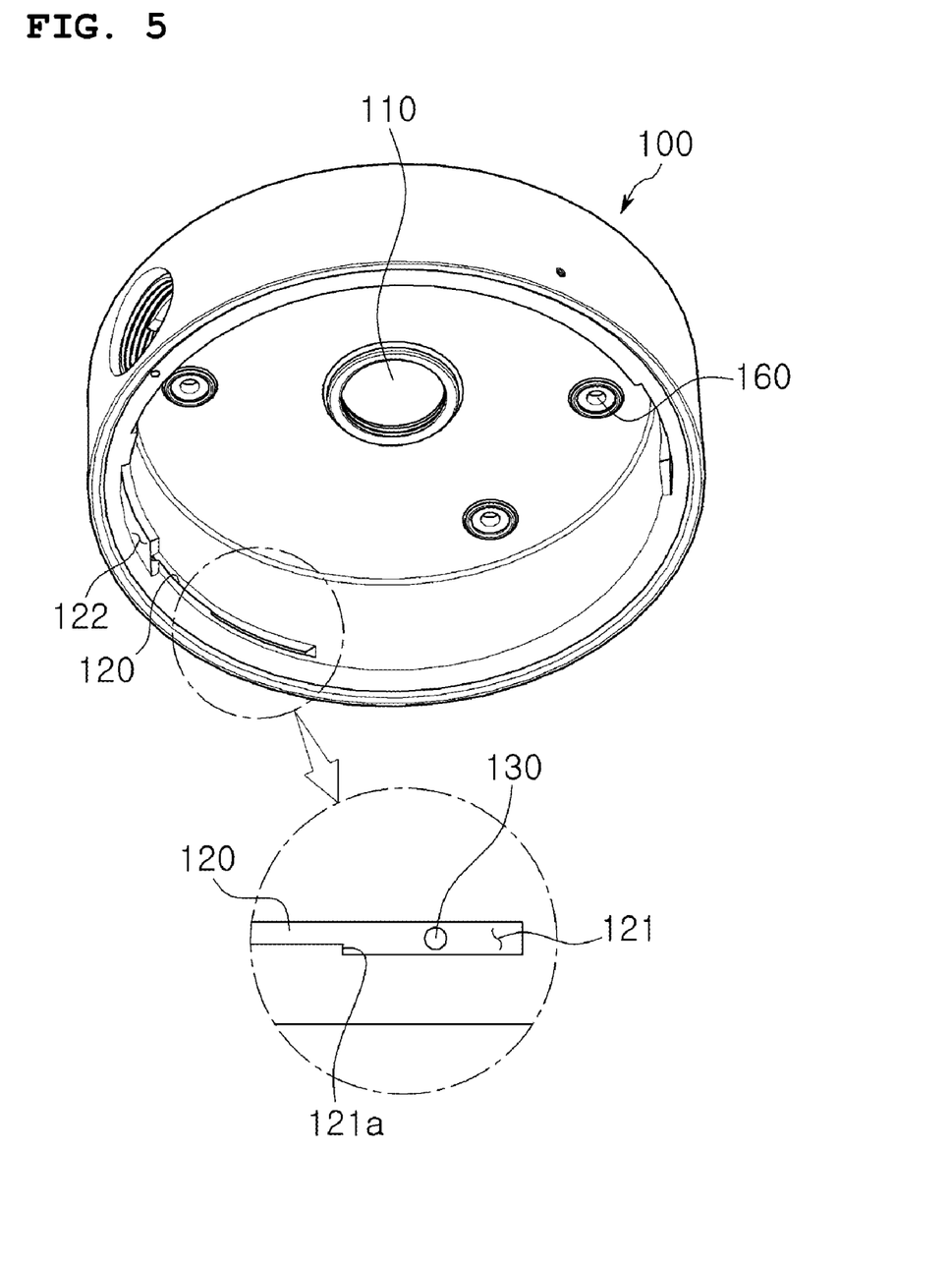
FIG. 5 is a perspective view illustrating the construction of a housing according to the present invention.

FIG. 5 is a perspective view illustrating the construction of the housing 100 according to the present invention. The housing 100 has the shape of a container with a predetermined thickness. An outside wire insert hole 110 for supplying external power and mounting holes 160 for mounting the housing 100 are bored through the bottom of the housing 100.

Particularly, a pair of guide grooves 120 each having a discharge hole 130 is formed in the inner circumference of the housing 100 in such a way that they face each other. The guide grooves 120 include insert seats 122, respectively, so that coupling protrusions 210 which will be described later are simultaneously fitted into the insert seats.

In the preferred embodiment of the present invention, each guide groove 120 may further include a protrusion seat 121 in the innermost end thereof. Preferably, a step 121*a* is formed by the protrusion seat 121 so as to prevent the coupling protrusion 210 from being easily removed from the protrusion seat.

Further, according to the preferred embodiment of the present invention, each guide groove 120 may be formed such that its depth is reduced in a direction from an outer position to an inner position thereof. The guide grooves formed in this way press the coupling protrusions 210 when the mounting bracket 200 is rotated to be coupled to the housing, thus increasing the force of coupling.

Moreover, the lower surface of the guide groove 120 which is in contact with the coupling protrusion 210 may be inclined as shown in FIG. 4. As such, the inclined lower surface increases the contact area.

The discharge hole 130 functions to discharge rainwater through each guide groove 120 to the outside of the housing 100. Such a discharge hole 130 is formed on the line extrapolated from the lower surface of the guide groove 120 or formed on the lower surface to face downwards, thus allowing rainwater to be easily discharged. Preferably, the discharge hole 130 is formed in the protrusion seat 121 so as to prevent rainwater or impurities from entering the camera structure. More preferably, the discharge hole 130 is closed by a locking means such as a lock screw 131, thus minimizing the inflow of impurities, in addition to maintaining a draining function.

Meanwhile, in order to further enhance the waterproof effect, as shown in FIG. 4, the housing 100 may further include a step 140. The step 140 surrounds an end of the mounting bracket 200 that will be described below, thus preventing the mounting bracket 200 from being viewed from the side of the housing 100, therefore preventing the inflow of impurities or rainwater from the side of the housing 100.

As shown in FIGS. 3 and 4, the mounting bracket 200 has the shape of a disc which has at its center an outside wire mounting hole 220. Particularly, a stepped coupling part 240 is provided on the outer circumference of the mounting bracket 200. The bottom of the coupling part 240 is in contact with the edge of the lower surface of the housing 100, and the side surface of the coupling part 240 is higher than the guide groove 120. Further, the coupling protrusion 210 is provided on the side surface of the coupling part 240 and is guided by the corresponding guide groove 120.

Preferably, such a mounting bracket 200 is inclined downwards in a direction from a center to an outer position, thus allowing rainwater flowing into the housing 100 to collect at the edge of the housing 100. Further, in order to enable the holder 300 which will be described below to be easily mounted and to make it easy to utilize space, the mounting bracket 200 may be manufactured in multiple steps and its height reduced going outwards.

According to the preferred embodiment of the present invention, the mounting bracket 200 is formed such that its entire height is smaller than the internal depth of the housing 100. Thus, when the mounting bracket 200 is mounted to the housing 100, a space 230 is preferably formed between the mounting bracket and the housing. Such a space 230 serves to collect water such as rainwater, and in addition, serves to arrange the outside wire 1000 for supplying power if the outside wire 1000 should be long.

The holder 300 functions to mount the camera module which is usually used for the dome type security camera, and the construction of the holder remains the same as its general construction. Such a holder 300 uses a holder which may perform rotation on 2 or 3 axes in consideration of where it is installed, a monitoring area, and a photographing angle. Of course, the rotation of the holder may be performed manually. Further, the rotating angle of the holder may be adjusted automatically.

The dome screen 400 serves to capture the image of the camera module and protect the camera module. The dome screen 400 may be manufactured using common technology. Such a dome screen 400 may be mounted to a mounting protrusion 260 provided on the lower surface of the mounting bracket 200, by fastening screws 410 into protrusion insert holes 411. Further, the dome screen 400 may be fastened to the housing 100 in a threaded manner.

Mounting Method

Figure 6:
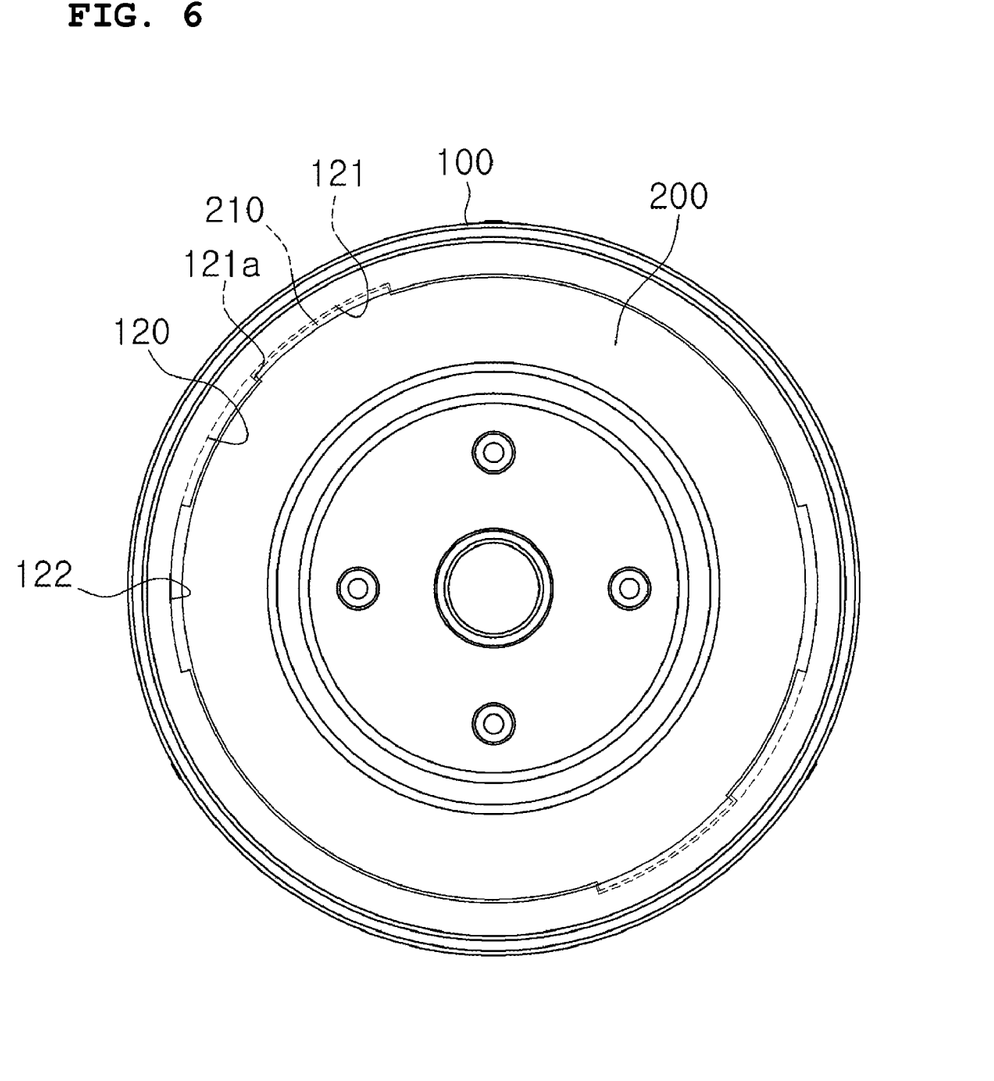
FIGS. 6 and 7 are sectional views illustrating the mounted state of the dome type security camera structure with the reinforced waterproofing function of the present invention, depending on the position of coupling protrusions.
Figure 7:
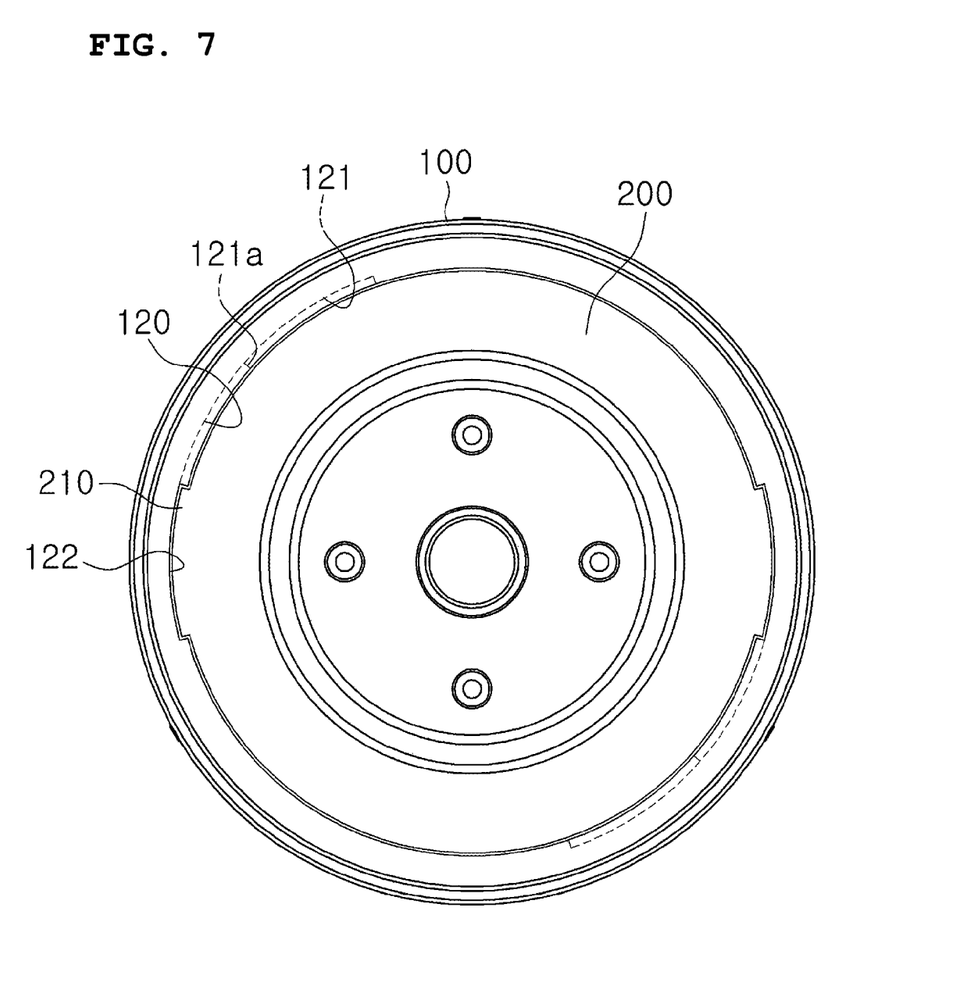

FIGS. 6 and 7 are sectional views illustrating the mounted state of the dome type security camera structure with the reinforced waterproofing function of the present invention, depending on the position of coupling protrusions. Since the method by which the power supply is connected to the camera module (not shown) which is mounted to the holder 300 is generally known, a detailed description will be omitted.

As shown in FIG. 6, the mounting bracket 200 equipped with the holder 300 is coupled to the housing 100 mounted to the outside, such as the outer wall. After each coupling protrusion 210 is fitted into the corresponding insert seat 122, the mounting bracket 200 is rotated.

Thereby, as shown in FIG. 7, each coupling protrusion 210 moves along the guide groove 120. The coupling protrusion 210 moving as such is finally seated in the protrusion seat 121.

When each coupling protrusion 210 is seated on the corresponding protrusion seat 121 as such, the mounting bracket 200 is further covered by the step 121*a*. Thus, the coupling protrusion 210 is stopped by the step 121*a*, thus locking the mounting bracket 200.

Finally, the dome screen 400 is fastened to the mounting bracket 200 using a fastening means such as a screw. In this way, the mounting operation of the dome type security camera structure with the reinforced waterproofing function according to the present invention is completed.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A dome type security camera structure with a reinforced waterproofing function, comprising:
    a housing (100) having an outside wire insert hole (110), and a pair of opposite guide grooves (120) provided on an inner surface of a sidewall of the housing, each of the guide grooves communicating with an outside via a discharge hole (130);
    a mounting bracket (200) having a coupling protrusion (210) guided by each of the guide grooves (120), the mounting bracket being gradually inclined outwards from a center thereof so that an edge thereof presses a lower surface of the housing and thus the mounting bracket is coupled to the housing;
    a holder (300) provided on a lower surface of the mounting bracket in such a way as to perform rotation on 2 or 3 axes, with a camera module being mounted to the holder; and
    a dome screen (400) mounted to the mounting bracket (200), and surrounding the holder (300) in such a way as to adjust a position of the holder in all directions.

2. The dome type security camera structure according to claim 1, wherein the housing (100) further comprises a step (140) so that an outer edge of an outer circumference thereof surrounds an entire outer circumference of the mounting bracket (200).

3. The dome type security camera structure according to claim 1, wherein the mounting bracket (200) further comprises an airtight sealing member (250') between the mounting bracket and the dome screen (400) to airtightly seal a gap therebetween.

4. The dome type security camera structure according to claim 1, wherein the guide groove (120) comprises on an inner end thereof a protrusion seat (121) to receive the coupling protrusion (210).

5. The dome type security camera structure according to claim 1, wherein the guide groove (120) is formed such that a depth thereof is reduced in a direction from an outer position to an inner position.

6. The dome type security camera structure according to claim 1, wherein contact side surfaces of the guide groove (120) and the coupling protrusion (210) are inclined.

7. The dome type security camera structure according to claim 1, wherein the discharge hole (130) is formed on the inner end of the guide groove (120).

8. The dome type security camera structure according to claim 1 or 7, wherein the discharge hole (130) is closed by a lock screw (131).

9. The dome type security camera structure according to claim 8, wherein the discharge hole (130) is formed in the protrusion seat (121).

10. The dome type security camera structure according to claim 9, wherein a lower portion of the protrusion seat (121) is formed to be lower than the guide groove (120), thus providing a step (121*a*).

11. The dome type security camera structure according to claim 1, wherein the mounting bracket (200) has on a central portion thereof an outside wire mounting hole (220) to be placed on a central axis of the outside wire insert hole (110), and is stepped outward from the outside wire mounting hole (220).

12. The dome type security camera structure according to claim 11, wherein a step of the mounting bracket (200) is inclined downward in a direction from an inner position to an outer position.

13. The dome type security camera structure according to any one of claims 1, 11, and 12, wherein the mounting bracket (200) is mounted to have a hollow space (230) between the mounting bracket and an inner surface of the housing (100).

* * * * *